US008897035B2

(12) United States Patent
Lee (10) Patent No.: US 8,897,035 B2
(45) Date of Patent: Nov. 25, 2014

(54) CONTAINER AND DISPLAY DEVICE INCLUDING THE SAME

(75) Inventor: Dong-Su Lee, Cheonan-si (KR)

(73) Assignee: Samsung Display Co., Ltd., Yongin (KR)

( * ) Notice: Subject to any disclaimer, the term of this patent is extended or adjusted under 35 U.S.C. 154(b) by 250 days.

(21) Appl. No.: 13/244,185

(22) Filed: Sep. 23, 2011

(65) Prior Publication Data

US 2012/0176761 A1 Jul. 12, 2012

(30) Foreign Application Priority Data

Jan. 12, 2011 (KR) ........................ 10-2011-0003223

(51) Int. Cl.
*H05K 7/02* (2006.01)
*G02F 1/1333* (2006.01)

(52) U.S. Cl.
CPC *G02F 1/133308* (2013.01); *G02F 2001/13332* (2013.01); *G02F 2001/133314* (2013.01); *G02F 2001/133317* (2013.01); *Y10S 345/905* (2013.01)
USPC .............................. 361/810; 349/58; 345/905

(58) Field of Classification Search
CPC ............ H05K 9/00; G06F 1/16; H01R 29/00; H01R 13/648; G02F 1/1333
USPC ....................... 361/679.21–679.3; 312/223.1; 345/169.905; 349/58.65; 348/794, 836; 248/176.1, 346.1, 225.21, 917; 455/575.1, 550.1, 347
See application file for complete search history.

(56) References Cited

U.S. PATENT DOCUMENTS

| | | | |
|---|---|---|---|
| 6,654,231 B2 * | 11/2003 | Teshima | 361/679.3 |
| 6,670,647 B1 * | 12/2003 | Yamasaki et al. | 257/99 |
| 7,206,042 B2 * | 4/2007 | Yang et al. | 349/106 |
| 7,271,867 B2 * | 9/2007 | Kim et al. | 349/138 |
| 7,288,883 B2 * | 10/2007 | Ji et al. | 313/495 |
| 7,319,287 B2 * | 1/2008 | Ahn | 313/299 |
| 7,609,510 B2 * | 10/2009 | Tatsukami et al. | 361/679.33 |
| 7,888,689 B2 * | 2/2011 | Kim et al. | 257/81 |
| 8,040,457 B2 * | 10/2011 | Kim et al. | 349/61 |
| 8,620,395 B2 * | 12/2013 | Kang et al. | 455/575.1 |
| 2006/0072052 A1 * | 4/2006 | Kim et al. | 349/60 |

(Continued)

FOREIGN PATENT DOCUMENTS

| | | |
|---|---|---|
| CN | 1758093 A | 4/2006 |
| JP | 2006-106750 A | 4/2006 |

(Continued)

*Primary Examiner* — Zachary M Pape
*Assistant Examiner* — Douglas Burtner
(74) *Attorney, Agent, or Firm* — Knobbe, Martens, Olson & Bear LLP (57) ABSTRACT

A container unit and a display device including the same are disclosed. The container unit, containing a display unit, may include: a bottom chassis including i) a first portion spaced apart from a rear side of the display unit by a first distance, and ii) a second portion extending from the first portion and spaced apart from the rear side of the display unit by a second distance longer than the first distance, the second portion having a first opening. The display device may further include an insulation frame disposed between the second portion of the bottom chassis and the display panel, and having a second opening which is communicated with the first opening and smaller than the first opening, wherein one end of the insulation frame facing a central portion of the second opening has a chamfered structure at one side edge thereof.

14 Claims, 10 Drawing Sheets

(56) References Cited

U.S. PATENT DOCUMENTS

| | | |
|---|---|---|
| 2006/0223347 A1* | 10/2006 | Kim .............................. 439/95 |
| 2008/0020617 A1* | 1/2008 | Lee et al. ...................... 439/189 |
| 2008/0089018 A1* | 4/2008 | Kim et al. ..................... 361/681 |
| 2010/0033641 A1* | 2/2010 | Ogasawara et al. ........... 348/836 |
| 2010/0060807 A1* | 3/2010 | Green et al. .................. 348/836 |
| 2010/0164859 A1* | 7/2010 | Huang .......................... 345/102 |

FOREIGN PATENT DOCUMENTS

| | | |
|---|---|---|
| KR | 10-2006-0021426 A | 3/2006 |
| KR | 10-2006-0021559 A | 3/2006 |
| KR | 10-2006-0030190 A | 4/2006 |
| KR | 10-2006-0031002 A | 4/2006 |
| KR | 10-2006-0097992 A | 9/2006 |

* cited by examiner

CONTAINER AND DISPLAY DEVICE INCLUDING THE SAME

CROSS-REFERENCE TO RELATED APPLICATIONS

This U.S. non-provisional patent application claims priority under 35 U.S.C. §119 of Korean Patent Application No. 10-2011-0003223, filed on Jan. 12, 2011, the entire contents of which are hereby incorporated by reference.

BACKGROUND

1. Field

The described technology generally relates to a display device, more particularly, to a container unit containing a display panel and a display device including the same.

2. Description of the Related Technology

In accordance with the rapidly developing semiconductor technology these days, demand on compact and lightweight display devices with improved performances has been growing. Liquid crystal display (LCD) devices and organic light-emitting diodes (OLEDs) are expected to overcome the weaknesses of CRT tubes and to replace them.

LCD devices basically work through the following processes. When a voltage is applied to a specific molecular arrangement of liquid crystal, the molecular arrangement changes and consequently, optical features of liquid crystal cells such as birefringence, rotary polarization, dichroism and light scattering also change resulting in visual effects. In summary, LCD devices are non-emissive display devices which display information using light modulations by liquid crystal cells.

OLED technology has recently received significant commercial attention for next generation display devices. An OLED device displays images through self-emissive phenomenon that electrons and holes injected through a cathode and an anode combine each other in an organic material, thereby emitting light. As an active device, OLED displays have high luminous efficiency with low power consumption, and thus can be driven even at about 15V or below. Therefore, such displays are suitable for small-sized display devices, and have an advantage of low production cost.

These display devices are used in compact electronic equipment such as mobile phones. Considering the size of the mobile phone, parts of in display device are fully integrated to minimize the whole size of equipment.

SUMMARY

One inventive aspect is a container unit preventing external impact from being transferred to contents.

Another aspect is a display device which significantly improves poor mechanical and/or electrical contacts between a flexible printed circuit board (FPCB) and a bottom chassis, and is resistant against external impacts.

Another aspect is a display device including a display unit displaying images, and a container unit containing the display unit. The container unit includes a bottom chassis including a first portion which is spaced apart from a rear side of the display unit by a first distance, and a second portion which extends from the first portion and is spaced apart from the rear side of the display unit by a second distance longer than the first distance, the second portion having a first opening; and an insulation frame disposed between the second portion of the bottom chassis and the display panel, and having a second opening which is communicated with the first opening and smaller than the first opening, wherein one end of the insulation frame facing a central portion of the second opening has a chamfered structure at one side edge thereof.

One end of the insulation frame may protrude from a side surface of the second portion which is exposed by the first opening.

Insulation frame may include: a first surface adjacent to the second portion of the bottom chassis; a second surface spaced apart from the first surface in parallel, the second surface being shorter than the first surface; a third surface vertically extending from an edge of the first surface; and a fourth surface connecting the first and third surfaces and having an acute angle, wherein one end of the insulation frame may be the third and fourth surfaces.

The insulation frame may include: a first surface adjacent to the second portion of the bottom chassis; a second surface spaced apart from the first surface in parallel; and a third surface connecting the first and second surfaces and having an acute angle, wherein one end of the insulation frame facing the center of the second opening may be the third surface.

The bottom chassis may further include a curved portion connecting the first and second portions.

The side surface of the second portion exposed by the first opening may be a vertical surface.

A gap may be defined by the display unit, the first portion and the second portion of the bottom chassis, and the gap may be communicated with the first and second openings.

The insulation frame may be disposed in the gap, and may further include a tape disposed between the insulation frame and display unit, wherein the tape may have an insulating material or a conductive material.

The display unit may include self-luminescent organic light-emitting diode.

The display device may further include a backlight unit providing light to the display unit.

The second portion of the bottom chassis may be a region where an FPCB is overlapped on an edge of a rear side of the bottom chassis.

The insulation frame may have a plastic.

The container unit may include: a conductive frame including a first portion which may be spaced apart from a rear side of a content by a first distance, and a second portion extending from the first portion and spaced apart from the rear side of the content by a second distance longer than the first distance; and an insulation frame disposed between the second portion of the insulation frame and the content, wherein one side edge of one end of the insulation frame may not contact the content.

The one end of the insulation frame may have a structure that one side of the edge may be cut off.

The one end of the insulation frame may have a chamfered surface.

DETAILED DESCRIPTION

Embodiments will be described below in more detail with reference to the accompanying drawings.

When an element is referred to as being "on" another element, it can be directly on the other layer or substrate, or intervening layers may also be present. In the figures, the dimensions of layers and regions are exaggerated for clarity of illustration. In the drawings, the thicknesses of layers and regions are exaggerated for clarity.

In the figures, the dimensions of layers and regions may be exaggerated for clarity of illustration. Accordingly, areas of the exemplary views may be modified according to manufacturing techniques and/or allowable errors. The disclosed embodiments are not limited to specific forms, but include modifications of forms, which are achieved from manufacturing processes. For example, an etched region illustrated as a right angle may have rounded or curved features. Regions illustrated in the figures have properties, and shapes of the regions illustrated in the figures are provided only to show specific shapes of the regions. Thus, these do not limit the scope of the inventive concept. In various embodiments, terms such as the first or the second are used for describing various elements but elements are not limited to these terms. These terms are used only to distinguish an element from another. An embodiment described and exemplified herein includes a complementary embodiment thereof.

The terms of a singular form may include plural forms unless referred to the contrary. Terms "comprises" and/or "comprising" do not exclude existence or addition of one or more than one components, steps, movements and/or device.

Display Device

Embodiment 1

Figure 1:
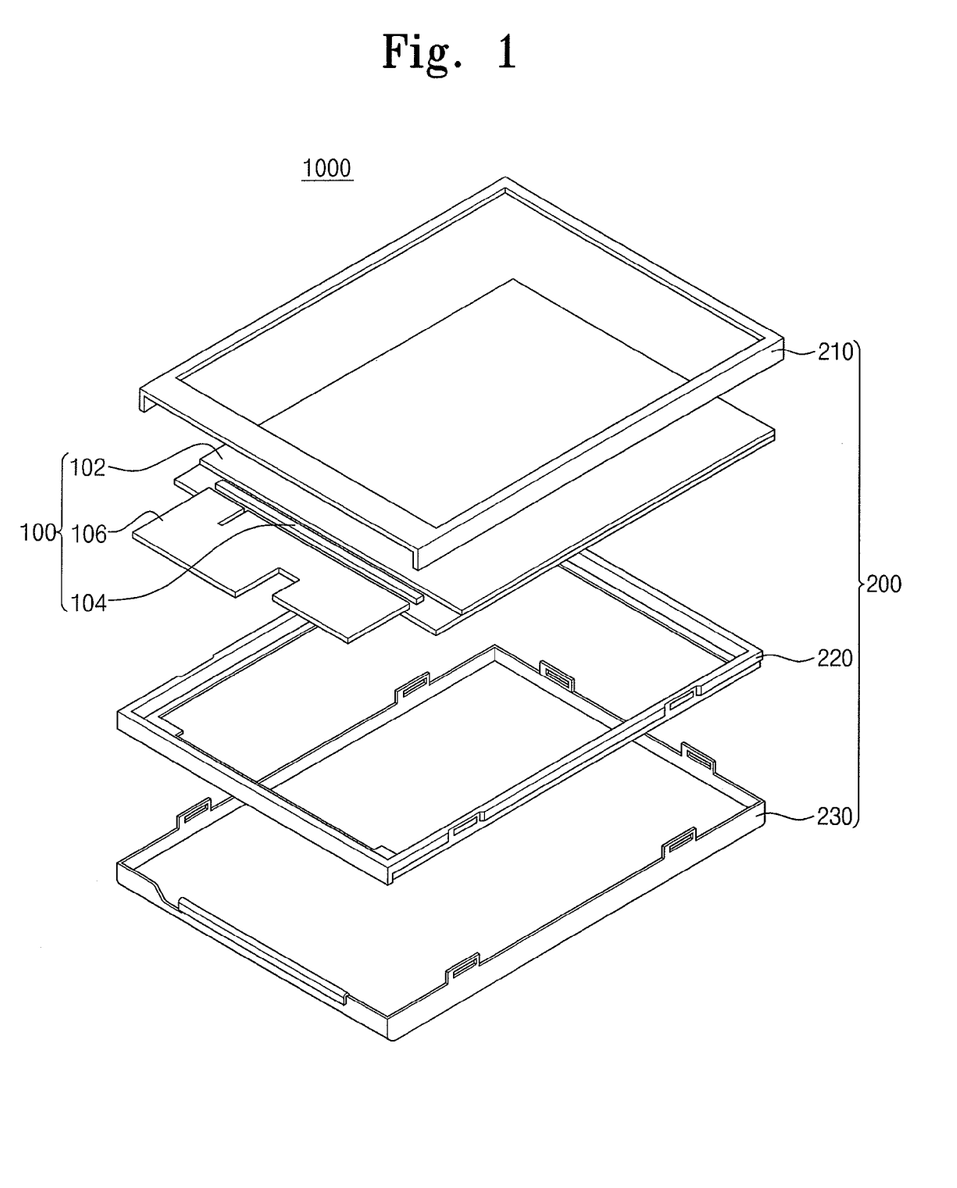
FIG. 1 is an exploded perspective view illustrating a display device of an embodiment.
Figure 2A:
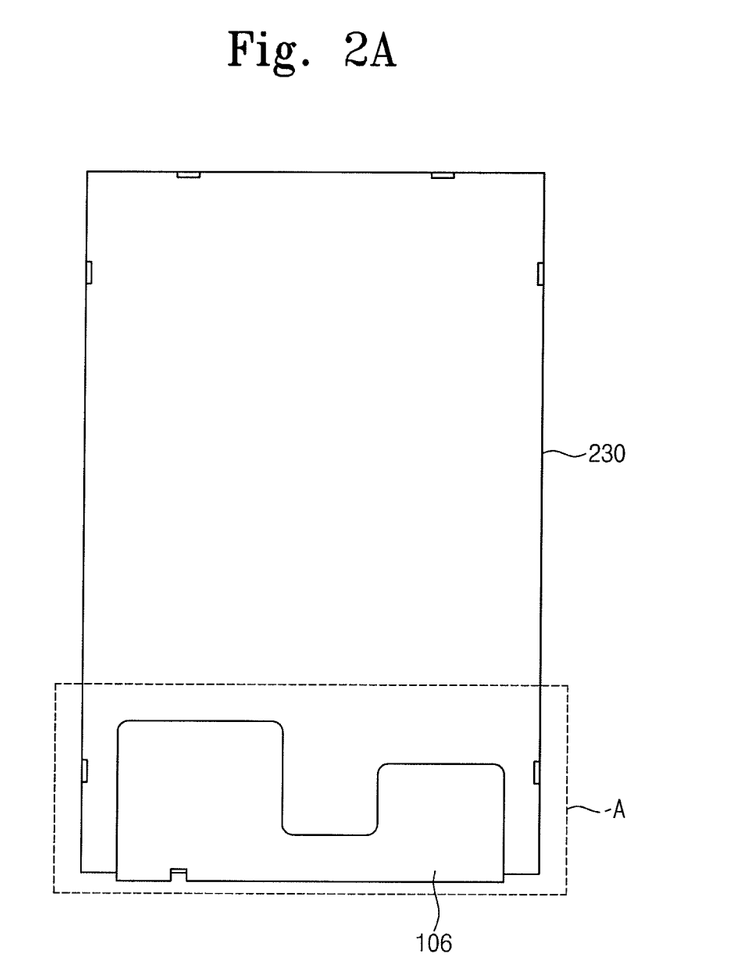
FIGS. 2A and 2B are plan views of a rear side of the display device of FIG. 1.
Figure 2B:
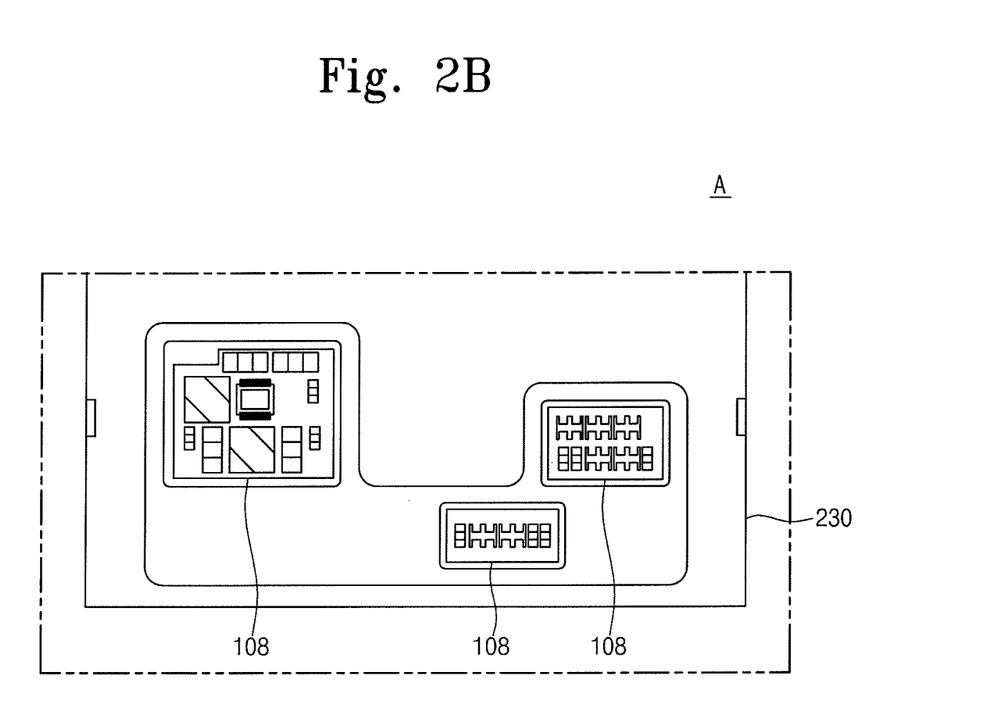

FIG. 1 is an exploded perspective view illustrating a display device of an embodiment, and FIGS. 2A and 2B are plan views of a rear side of the display device of FIG. 1. FIG. 2B is a magnified plan view of the portion A in FIG. 2A.

Figure 2C:
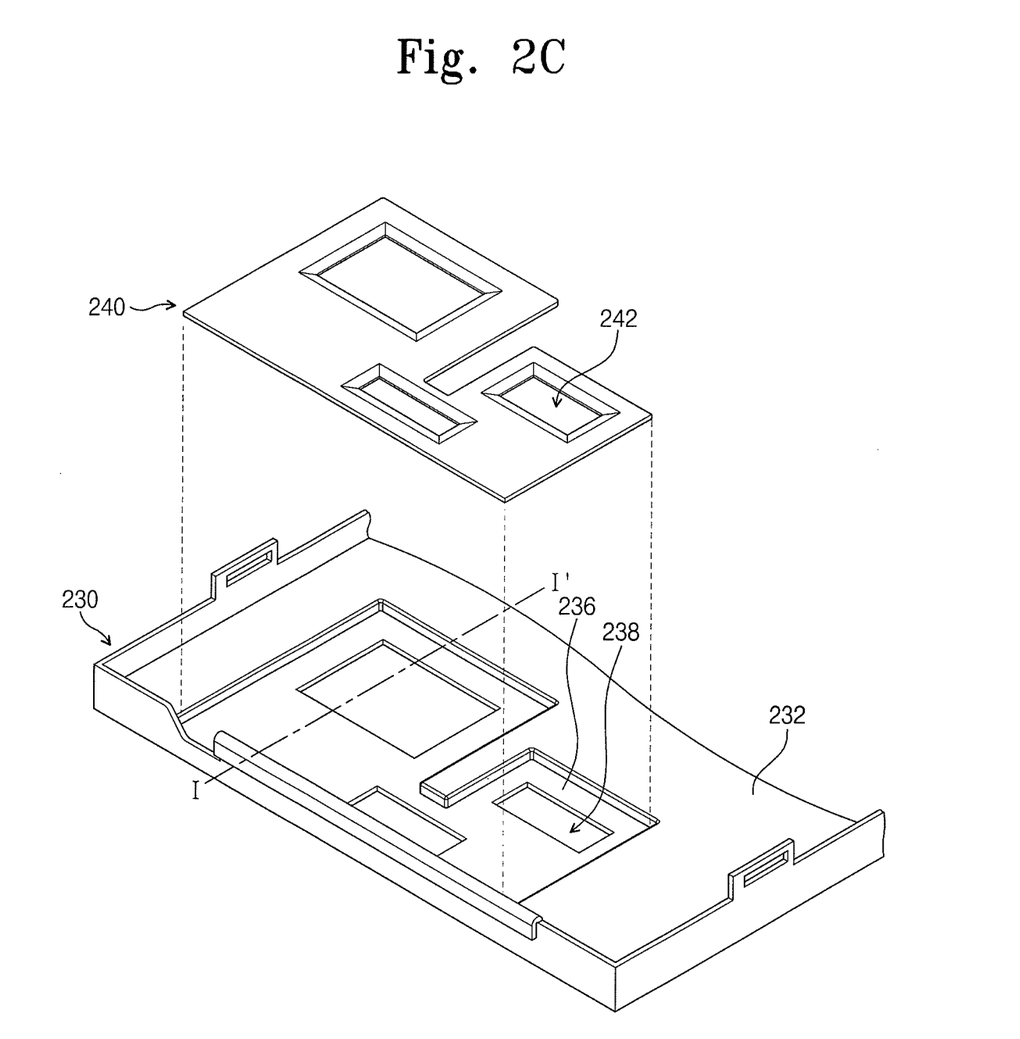
FIG. 2C is an exploded perspective view illustrating a container unit of the display device of FIG. 1.
Figure 2D:
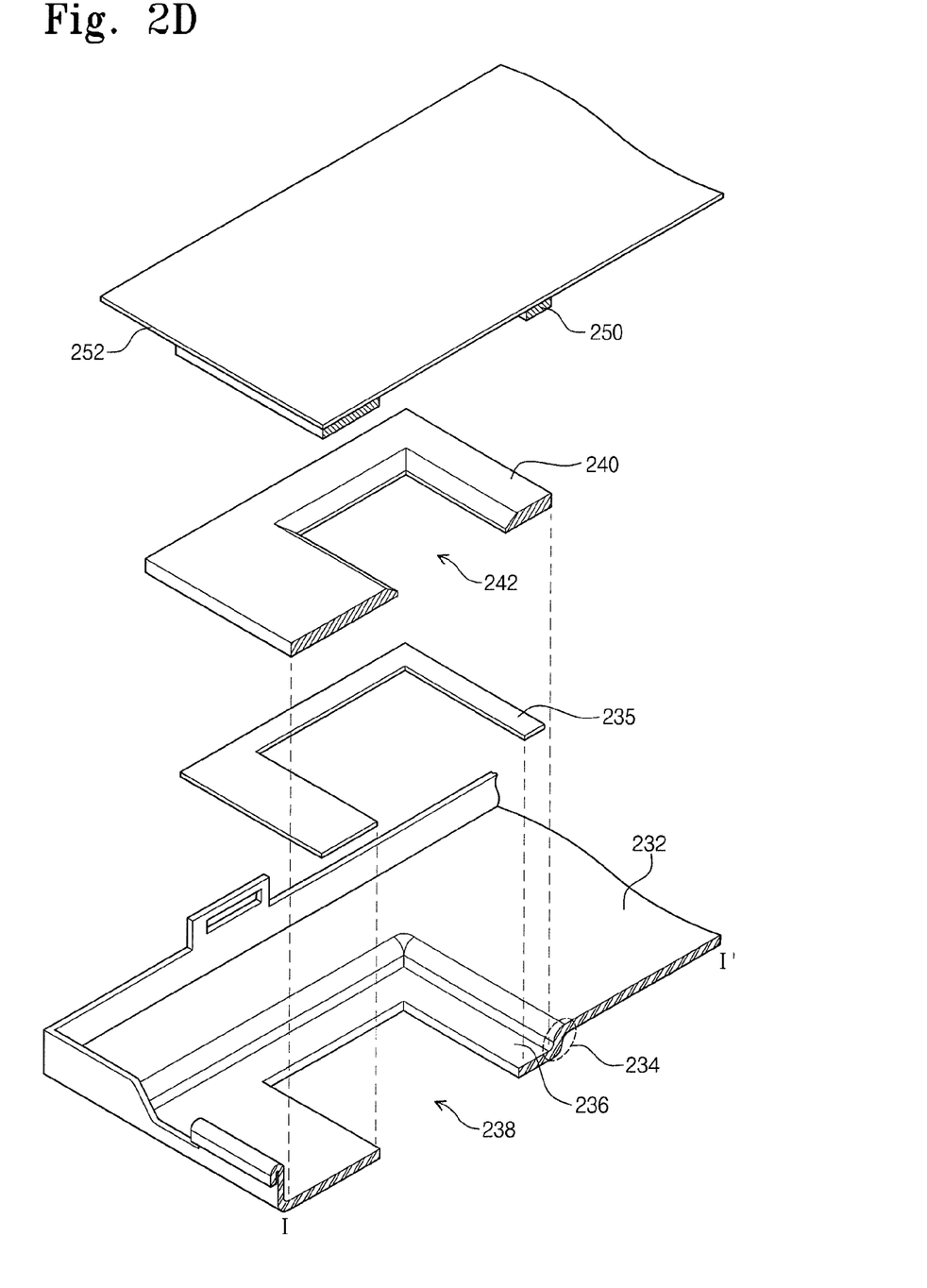
FIG. 2D is a cross-sectional view of the container unit, which is taken along the line I-I' of FIG. 2C.
Figure 2E:
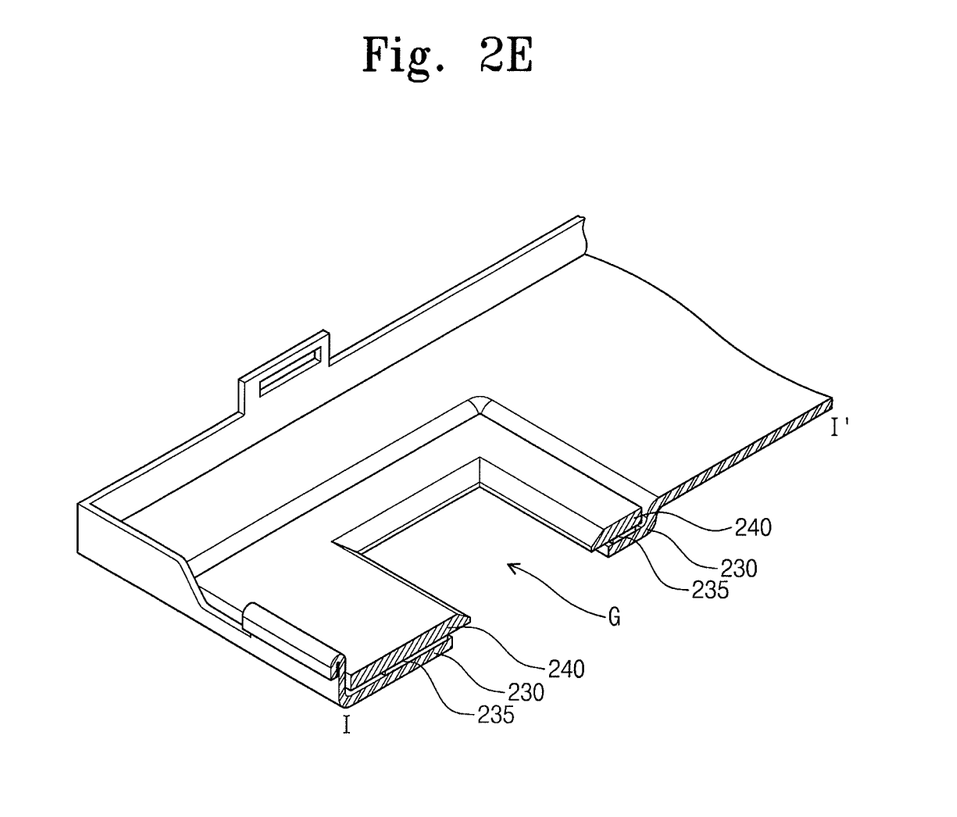
FIG. 2E is an exploded perspective view illustrating the container unit of FIG. 1.
Figure 3A:
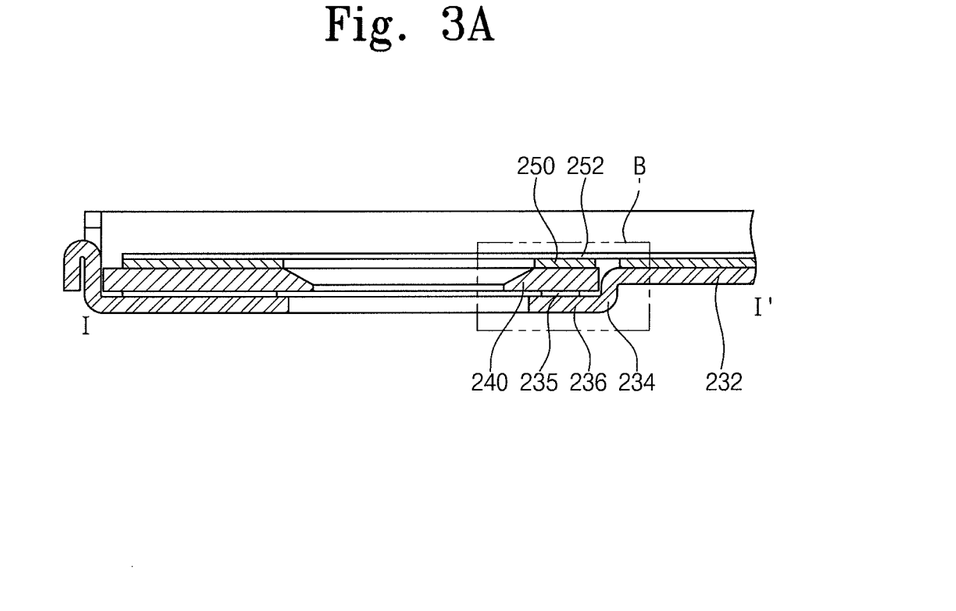
FIGS. 3A and 3B are cross-sectional views illustrating the container unit of the display device of FIG. 1.
Figure 3B:
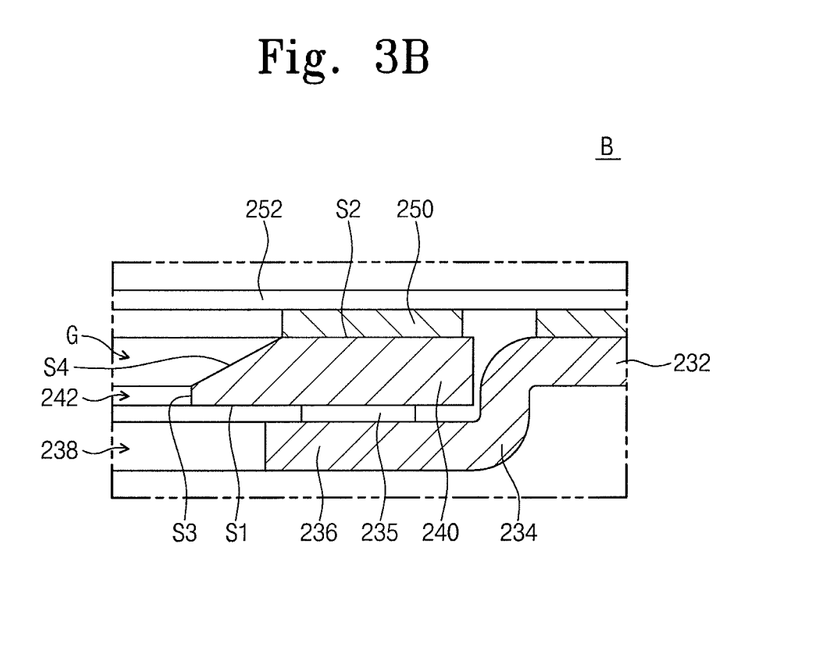

FIGS. 2C to 2E are perspective views illustrating a container unit of the display device of FIG. 1. FIGS. 3A and 3B are sectional views illustrating the container unit of the display device of FIG. 1. FIG. 3B is a magnified plan view of the B portion of FIG. 3A.

Referring to FIGS. 1, 2A through 2E, 3A and 3B, a display device 1000 includes a display unit 100 and a container unit 200. The display device 1000 may be an organic electroluminescent display device. The organic electroluminescent display device may include an emitting layer formed of an organic material self-generating light.

The display unit 100 includes a display panel 102 displaying images, a drive chip 104 which provides a drive signal to the display panel 102, and a flexible printed circuit board (FPCB) 106 which is electrically connected to the drive chip 104.

The display panel 102 is formed of a plurality of unit pixels to thereby display images. The display panel 102 may include a display region where images are displayed, and a peripheral region surrounding the display region.

In the display region, a plurality of data lines (not shown) may be formed, which extend in a first direction and are equally spaced apart from each other in a second direction which is perpendicular to the first direction. A plurality of gate lines (not shown) may be formed, which extend in the second direction and are equally spaced apart from each other in the first direction. A pixel region may be defined as a matrix structure by pairs of neighboring data lines and gate lines among the pluralities of data lines and gate lines.

The drive chip 104 and the FPCB 106 may be provided at one side of the display panel 102. The drive chip 104 and the FPCB 106 may be electrically connected via an anisotropic conductive film (ACF).

The drive chip 104 may provide a drive signal and a drive voltage to the display panel 102. The drive chip 104 may include two or more chips which are divided into a chip for data line and a chip for gate line, or include one integrated chip. In addition, the drive chip 104 may be mounted on the display panel 102 through chip on glass (COG) process.

The FPCB 106 is electrically connected to the drive chip 104, and may provide a control signal and a drive voltage to the drive chip 104. On the FPCB 106, a timing controller for controlling the timing of the drive signal, and a memory for storing a data signal may be mounted.

Referring to FIGS. 2A and 2B, the FPCB 106 may have a bended structure wrapping one side of a bottom chassis 230. As shown in FIG. 2A, the FPCB 106 may wrap the edge of the rear side of the bottom chassis 230. FIG. 2B is a magnified plan view of A portion of FIG. 2A. As shown in FIG. 2B, a circuit of the FPCB 106 may be disposed on the rear side of the bottom chassis 230.

Referring to FIG. 1 again, a container unit 200 may include a top chassis 210, a mold frame 220, a bottom chassis 230 and an insulation frame. The top chassis 210 may fix the display unit 100. The mold frame 220 may contain the display unit 100. The mold frame 220 may include an extended side surface allowing a containing space to be formed, and may be formed of a synthetic resin.

The mold frame 220 may be contained in the bottom chassis 230 made of metal. The bottom chassis 230 may include an extended side surface to form a containing space.

FIG. 2C is an exploded perspective view illustrating the bottom chassis and the insulation frame. In FIG. 2C, an insertion pattern 235 (See FIG. 2D) disposed between the bottom chassis 230 and the insulation frame 240 are not shown. FIG. 2D is a cross-sectional view of the container unit, which is taken along the line I-I' of FIG. 2C. In FIG. 2D, the insertion pattern 235 and tapes 250 and 252 as well as the bottom chassis 230 and the insulation frame 240 are shown. FIG. 2E is a cross-sectional view of the container unit, which is taken along the line I-I' of FIG. 2C. FIG. 2E illustrates a structure in which the bottom chassis 230, the insertion pattern 235, and the insulation frame 240 are stacked.

Referring to FIGS. 2C through 2E, the bottom chassis 230 includes a first portion 232, a second portion 236 which extends from the first portion 232, and a curved portion 234 which connects the first portion 232 and the second portion 236. The first portion 232 may be spaced apart from the rear side of the display unit 100 by a first distance, and the second portion 236 may be spaced apart from the rear side of the display unit 100 by a second distance which is substantially longer than the first distance. Due to the difference in heights between the first and second portions 232 and 236, the first portion 232 and the second portion 236 may be connected by the curved portion 234. The second portion 236 may be a portion where the FPCB 106 overlaps with the edge of the rear side of the bottom chassis 230. In addition, the second portion 236 may have at least one first opening 238. The number and structure of the first opening 238 may vary according to the number and structure of circuits of the FPCB 106. The side surface of the second portion 236, which is exposed by the first opening 238, may be a vertical surface.

A gap G shown in FIG. 2E may be defined by the first and second portions 232 and 236. The gap G may be communicated with the first opening 238.

The insulation frame 240 may be disposed in the gap G. The insulation frame 240 may be disposed between the display unit 100 and the second portion 236. The insulation frame 240 may have at least one second opening 242. The number and structure of the second opening 242 may vary according to the number and structure of circuits of the FPCB 106. In addition, the second opening 242 may be connected to the first opening 238 and the gap G. The second opening 242 may be substantially smaller than the first opening 238.

One end of the insulation frame 240 facing towards the center of the second opening 242 may further protrude towards the center of the second opening 242 than the second portion 236 of the bottom chassis 230. This means that one end of the insulation frame 240 may further protrude than the side surface of the second portion 236 which is exposed by the first opening 238.

One end of the insulation frame 240 may have a chamfered structure (or chamfered portion) at one side edge thereof. In one embodiment, as shown in FIGS. 3A and 3B, the insulation frame 240 includes a first surface S1 adjacent to the second portion 236, a second surface S2 which is substantially shorter than the first surface S1 and spaced apart from the first surface S1 in substantially parallel therewith, a third surface S3 substantially vertically extending from the first surface S1, and a fourth surface S4 connecting the second surface S2 and the third surface S3 to form an acute angle. One end of the insulation frame 240 may be the third and fourth surfaces S3 and S4.

Since the third surface S3 and the fourth surface S4 do not contact the display unit 100, the display unit 100 may be less influenced by external impacts.

In addition, the insulation frame 240 may be formed at least partially of plastic. Accordingly, the insulation frame 240 may insulate the FPCB 106 from other conductive patterns.

In one embodiment, the display device further includes tapes 250 and 252 which are disposed on the insulation frame 240. The tapes 250 and 252 may have a multilayer structure. The tapes 250 and 252 may protect the display unit 100, or function to attach the display unit 100 and the container unit 200. The tapes 250 and 252 may be formed of an insulator or a conductive material.

The tapes 250 and 252 having the multilayer structure are disposed to fill up a stepped region between the first portion 232 and the second portion 236 of the bottom chassis 230. The top surface of tapes 250 and 252 may be substantially flat. The display unit 100 may be mounted on the flat surface.

Referring to FIG. 3A, the bottom chassis 230 and the insulation frame 240 of the display device according to the embodiments of the inventive concept are illustrated. One end of the insulation frame has a chamfered surface.

Display Device

Embodiment 2

Figure 4A:
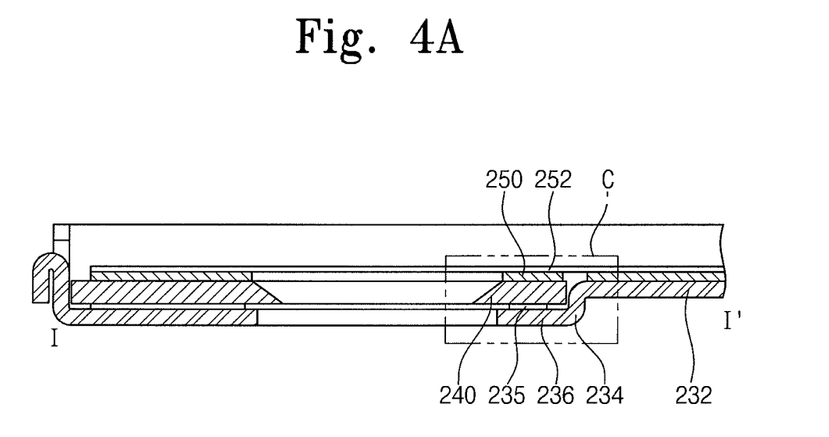
FIGS. 4A and 4B are cross-sectional views illustrating the container unit of the display device according to another embodiment.
Figure 4B:
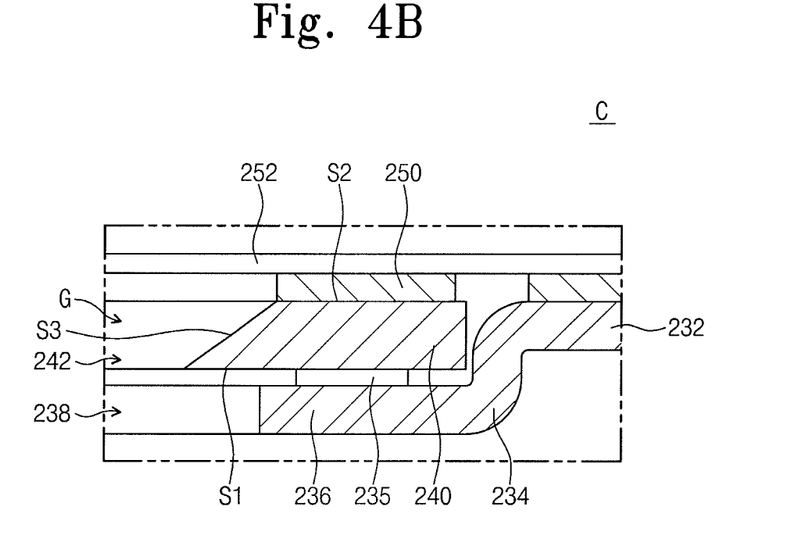

FIGS. 4A and 4B are cross-sectional views illustrating a container unit according to another embodiment. FIG. 4B is a magnified plan view of C portion of FIG. 4A.

Referring to FIGS. 1, 4A and 4B, a display device 1000 includes a display unit 100 and a container unit 200.

In the present embodiment, the display unit 100 includes a display panel 102 which includes an organic light-emitting diode displaying images, a drive chip 104 providing the display panel 102 with a drive signal, and an FPCB 106 which is electrically connected to the drive chip 104.

In the present embodiment, the container unit 200 includes a top chassis 210, a mold frame 220, a bottom chassis 230 and an insulation frame 240. The bottom chassis 230 includes a first portion 232, a second portion 236 extending from the first portion 232, and a curved portion 234 connecting the first portion 232 and the second portion 236. The first portion 232 is spaced apart from the rear side of the display unit by a first distance, and the second portion 236 may be a portion where the FPCB 106 overlaps with the edge of the rear side of the bottom chassis 230. The second portion 236 may have at least one first opening 238. The side surface of the second portion 236, which is exposed by the first opening 238 may be a vertical surface. The curved portion 234 may connect the first and second portions 232, 236.

A gap G may be defined by the display unit 100, the first and second portions 232, 236, and the gap G may be communicated with the first and second openings.

The insulation frame 240 may be disposed in the gap G. The insulation frame 240 may be disposed between the display unit 100 and the second portion 236. The insulation frame 240 may have at least one second opening 242. In addition, the second opening 242 may be connected to the first opening 238 and the gap G. The second opening 242 may substantially be smaller than the first opening 238.

One end of the insulation frame 240 facing towards the center of the second opening 242 may further protrude towards the center of the second opening 242 than the second portion 236 of the bottom chassis 230. As described already, one end of the insulation frame 240 may further protrude than the side surface of the second portion 236 which is exposed by the first opening 238.

One end of the insulation frame 240 may have a chamfered structure at one side edge thereof. The insulation frame 240 may include a first surface S1 adjacent to the second portion 236, a second surface S2 which is substantially shorter than the first surface S1 and spaced apart from the first surface S1 in substantially parallel therewith, a third surface S3 connecting the first surface S1 and the second surface S2 to form an acute angle. One end of the insulation frame 240 may be the third surface S3.

Since the third surface S3 does not contact the display unit 100, the display unit 100 may be less influenced by external impacts.

The display unit 100 and the container unit 200 which have not been described in Embodiments 2 are substantially the same as the display unit 100 and the container unit 200 which have been described in FIGS. 1 and 2A to 2C.

Display Device

Embodiment 3

Figure 5:
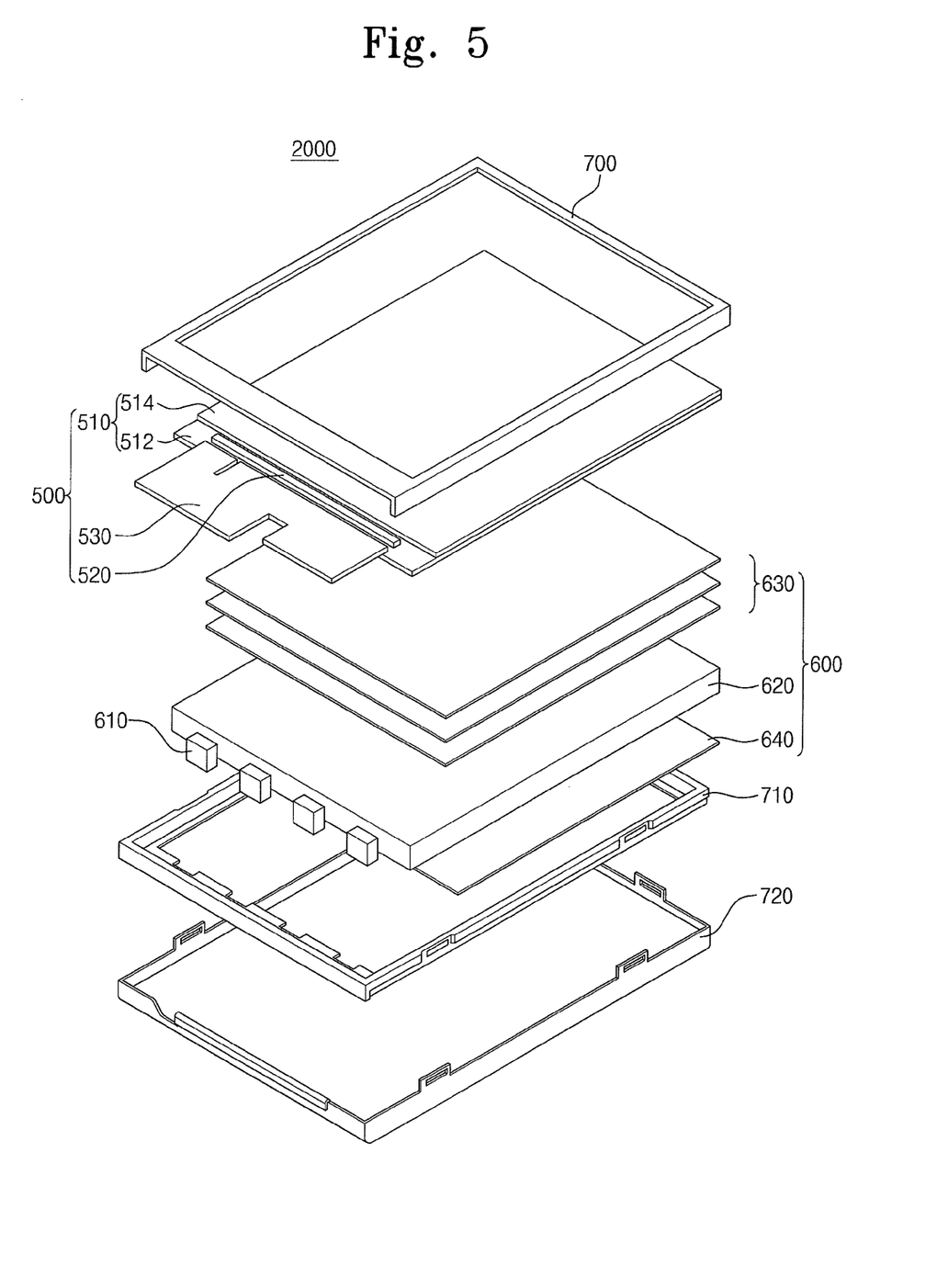
FIG. 5 is an exploded perspective view illustrating a display device according to another embodiment.

FIG. 5 is an exploded perspective view illustrating a display device according to another embodiment.

Referring to FIG. 5, a display device 2000 includes a display unit 500, a backlight unit 600 providing the display unit 500 with light, and container units 700, 710, 720 containing the display unit 500 and the backlight unit 600.

In the present embodiment, the display unit 500 includes a display panel 510 illustrating images, a drive chip 520 which provide a drive signal to the display panel 510, and an FPCB which is electrically connected to the drive chip 520.

In the present embodiment, the display panel 510 includes a first substrate 512, a second substrate 514 facing the first substrate 512, and a liquid crystal layer (not shown) disposed between the first substrate 512 and the second substrate 514. The first substrate 512 is formed of with a plurality of unit pixels in a matrix form, and is electrically connected to a drive chip 520 to receive a first drive voltage from the drive chip 520. The second substrate 514 is disposed on the first substrate 512, and may have a color filter layer (not shown) showing predetermined colors using lights passing through the liquid crystal layer. The color filter layer is formed through a thin film process, and may have RGB (red, green, blue) pixels. As liquid crystal molecules are oriented according to the electric field formed between the first substrate 512 and the second substrate 514, the liquid crystal layer may adjust the transmittance of light provided onto the second substrate 514.

A drive chip 520 and an FPCB 530 are provided at one side of the first substrate 512. The drive chip 520 and the FPCB 530 may be electrically connected to the first substrate 512 via an anisotropic conductive film (ACF).

The drive chip 520 may output a first drive voltage upon receiving a second drive voltage.

The drive chip 520 may provide a drive signal and the first drive voltage to the first substrate 512 to drive the display panel 510. The drive chip 520 may include two or more chips divided into a chip for data line and a chip for gate line, or include one integrated chip. In addition, the drive chip 520 may be mounted on the first substrate 512 through chip on glass (COG) process.

The FPCB 530 is electrically connected to the drive chip 520, and may provide a control signal and a drive voltage to the drive chip 520. On the FPCB 530, a timing controller for controlling the timing of the drive signal, and a memory for storing a data signal may be mounted.

The FPCB 530 may wrap one side of a backlight unit 600, and have a structure bended toward the rear side of a bottom chassis 720.

In the present embodiment, the backlight unit 600 includes a light source 610, a light guide plate 620 which guides light received from the light source 610 towards the display unit 500, optic sheets 630, and a reflection plate 640.

The light source 610 may include a light-emitting device (LED). In the present embodiment, four LEDs are provided as an example but the number of LEDs is not limited.

The light guide plate 620 may include a light-receiving portion for receiving light emitted from the light source 610, a light-emitting surface which emits light input from the light-receiving portion t toward the display unit 500, and a reflecting surface which reflects light input from the light-receiving portion toward the light-emitting surface.

The optic sheets 630 may be disposed between the light guide plate 620 and the display unit 500. The optic sheets 630 may improve characteristics of light such as brightness increase and brightness uniformity, and provide light with improved characteristics to the display unit 500.

A reflection plate 640 may be disposed under the light guide plate 620. The reflection plate 640 may reflect light leaked out of the light guide plate 620 to thereby enhance light utilization efficiency.

Container units 700, 710 and 720 may include a top chassis 700, a mold frame 710, a bottom chassis 720, and an insulation frame (not shown).

According to one embodiment, the structures of the container units 700, 710 and 720 may be substantially the same as that described in FIGS. 4A and 4B. Accordingly, no additional description will be provided.

Experimental Example

Figure 6:
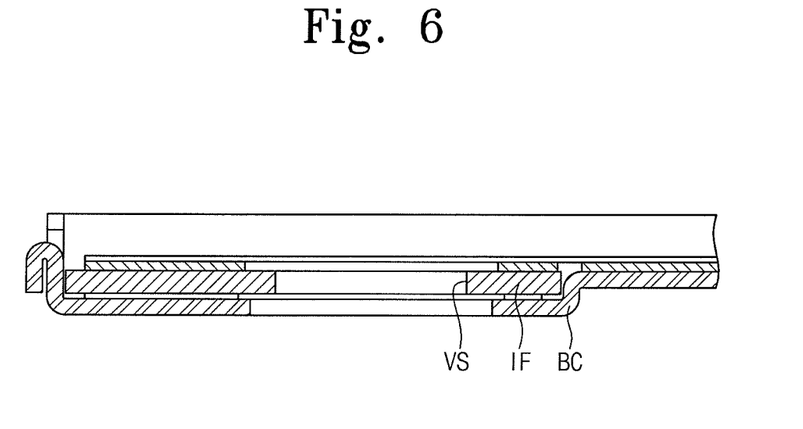
FIG. 6 is a cross-sectional view illustrating a general display device.

FIG. 6 illustrates a general display device. Table 1 is an evaluation report on hammer test results of the display device according to one embodiment and a general display device.

FIG. 6 illustrates a bottom chassis and an insulation frame in a general display device. One end of the insulation frame has a vertical surface.

Table 1 shows the result of external impact tests on edges and central portions of the display device according to embodiments and on the general display device. Upon applying impacts, the intensity of the impact was gradually increased on the edges and central portions of the devices.

TABLE 1

| Impact force | Display device according to embodiments | | General display device | |
|---|---|---|---|---|
| | Edge | Central portion | Edge | Central portion |
| 0.14 J | Pass | Pass | Pass | Pass |
| 0.20 J | Pass | Pass | Fail | Fail |
| 0.35 J | Pass | Pass | Fail | Fail |
| 0.50 J | Fail | Fail | Fail | Fail |
| 0.70 J | Fail | Fail | Fail | Fail |

Referring to Table 1, 0.14 J, 0.20 J, 0.35 J, 0.50 J and 0.70 J of external impact forces were applied to the respective edge and central portions of the display device according to embodiments, and no defective result of the display device was reported up to the force of 0.35 J.

On the contrary, the same external impact forces of 0.14 J, 0.20 J, 0.35 J, 0.50 J and 0.70 J were applied to the edge and central portions of the general display device, and defective results were reported with the force of 0.20 J and more.

Based on the test results, it can be understood that the insulation frame having a chamfered structure at one side edge thereof can prevent the forces associated with an external impact from being transferred to the display device because the chamfered structure of the insulation frame can reduce a contact area with the bottom chassis.

According to at least one of the disclosed embodiments, the FPCB and the bottom chassis can be mechanically and/or electrically insulated from each other. In addition, external impacts can be reduced by employing a chamfered structure on its one end of the edge.

The above-disclosed embodiments are to be considered illustrative and not restrictive, and the appended claims are intended to cover all such modifications, enhancements, and other embodiments.

What is claimed is:
1. A display device, comprising:
a display panel configured to display images and comprising a rear surface; and
a container containing the display panel, the container comprising: a bottom chassis including a first portion spaced apart from the rear surface of the display panel by a first distance and a second portion extending from the first portion, the second portion spaced apart from the rear surface of the display panel by a second distance that is longer than the first distance, and
an insulation frame disposed between the second portion of the bottom chassis and the display panel, wherein the bottom chassis has a first opening through the second portion, wherein the insulation frame has a second opening aligned with the first opening such that at least part of the first opening overlaps with at least part of the second opening, the second opening being smaller than the first opening, wherein the insulation frame comprises an edge portion around the second opening, the edge portion comprising a surface generally facing the display panel and slanted relative to the rear surface of the display panel.

2. The display device of claim 1, wherein the edge portion of the insulation frame protrudes beyond a side surface of the second portion forming the first opening.

3. The display device of claim 1, wherein the insulation frame includes:
- a first surface adjacent to the second portion of the bottom chassis;
- a second surface spaced apart from the first surface in substantially parallel therewith, wherein the second surface is shorter than the first surface;
- a third surface substantially vertically extending from an edge of the first surface; and
- a fourth surface connecting the first and third surfaces and having an acute angle, wherein one end of the insulation frame is the third and fourth surfaces.

4. The display device of claim 1, wherein the insulation frame includes:
- a first surface adjacent to the second portion of the bottom chassis;
- a second surface spaced apart from the first surface in substantially parallel therewith; and
- a third surface connecting the first and second surfaces and having an acute angle, wherein one end of the insulation frame facing the center of the second opening is the third surface.

5. The display device of claim 1, wherein the bottom chassis further comprises a curved portion connecting the first and second portions.

6. The display device of claim 1, wherein a side surface of the second portion forming the first opening is substantially perpendicular to the first portion.

7. The display device of claim 1, wherein a gap is defined by the display panel, the first portion and the second portion of the bottom chassis, and wherein the first and second openings are connected via the gap.

8. The display device of claim 7, wherein the insulation frame is disposed in the gap, wherein the display device further comprises a tape disposed between the insulation frame and display panel, and wherein the tape has an insulating material or a conductive material.

9. The display device of claim 1, wherein the display panel includes a self-luminescent organic light-emitting diode.

10. The display device of claim 1, further comprising a backlight unit configured to provide light to the display panel.

11. The display device of claim 1, wherein the second portion of the bottom chassis is a region where a flexible printed circuit board (FPCB) at least partially overlaps with an edge of a rear side of the bottom chassis.

12. The display device of claim 1, wherein the insulation frame is formed at least partially of a plastic.

13. The display device of claim 1, wherein one end of the insulation frame has a structure that one side of the edge is cut off.

14. The display device of claim 1, wherein one end of the insulation frame has a chamfered surface.

* * * * *